United States Patent
Kincaid et al.

(10) Patent No.: US 6,604,270 B2
(45) Date of Patent: Aug. 12, 2003

(54) ROBUST, LOW MASS STABILIZER BAR LINK ASSEMBLY

(75) Inventors: Jeffrey Lee Kincaid, Clarkston, MI (US); Manoi V. Bhandiwad, West Bloomfield, MI (US); Kurt K. Hauser, Northville, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 10/186,152

(22) Filed: Jun. 28, 2002

(65) Prior Publication Data

US 2002/0171221 A1 Nov. 21, 2002

Related U.S. Application Data

(62) Division of application No. 09/737,061, filed on Dec. 14, 2000, now abandoned.

(51) Int. Cl.[7] .............................................. B23P 11/00
(52) U.S. Cl. .................. 29/441.1; 29/511; 29/888.046; 280/124.152
(58) Field of Search .............. 280/124.107; 29/898.044, 29/898.049, 898.045, 898.046, 441.1, 888.09, 511

(56) References Cited

U.S. PATENT DOCUMENTS

| | | | |
|---|---|---|---|
| 3,315,952 A | * 4/1967 | Vittone | 267/189 |
| 4,888,287 A | * 12/1989 | Cichanowicz et al. | 435/34 |
| 5,062,656 A | * 11/1991 | Hynds et al. | 280/124.152 |
| 5,601,378 A | * 2/1997 | Fukukawa et al. | 403/140 |
| 5,704,631 A | * 1/1998 | Sparks et al. | 280/124.101 |
| 5,707,073 A | * 1/1998 | Stuker et al. | 280/89.11 |
| 5,954,353 A | * 9/1999 | Kincaid et al. | 280/124.152 |
| 6,007,079 A | * 12/1999 | Kincaid et al. | 280/93.511 |
| 6,042,293 A | * 3/2000 | Maughan | 403/135 |
| 6,076,840 A | * 6/2000 | Kincaid et al. | 280/124.107 |
| 6,109,816 A | * 8/2000 | Iwasaki | 403/135 |
| 6,146,045 A | * 11/2000 | Maughan | 403/165 |
| 6,254,114 B1 | * 7/2001 | Pulling et al. | 280/93.511 |
| 6,308,972 B1 | * 10/2001 | Kincad et al. | 280/124.107 |
| 6,398,446 B1 | * 6/2002 | Pazdirek et al. | 403/134 |
| 2001/0050469 A1 | * 12/2001 | Bernhardt | 280/93.51 |
| 2002/0146277 A1 | * 10/2002 | Kuroda | 403/135 |
| 2002/0171220 A1 | * 11/2002 | Pazdirek | 280/124.152 |

* cited by examiner

Primary Examiner—David P. Bryant
(74) Attorney, Agent, or Firm—Harness, Dickey & Pierce P.L.C.

(57) ABSTRACT

An end link adapted to interconnect a stabilizer bar and a suspension member within a vehicular suspension system includes a housing having a first socket, a second socket and a body interconnecting the first and second sockets. The end link also includes a first joint assembly pivotally interconnecting the first socket and the stabilizer bar and a second joint assembly pivotally interconnecting the second socket and the suspension member The first socket includes a net-shaped cavity to receive the first joint assembly.

11 Claims, 3 Drawing Sheets

ROBUST, LOW MASS STABILIZER BAR LINK ASSEMBLY

CROSS-REFERENCE TO RELATED APPLICATIONS

This application is a divisional of U.S. patent application Ser. No. 09/737,061 filed on Dec. 14, 2000, now abandoned. The disclosure of the above application is incorporated herein by reference.

BACKGROUND OF THE INVENTION

1. Technical Field

The present invention relates to a suspension system for motor vehicles and, more particularly, to an end link for connecting a stabilizer bar to a control arm of the suspension system.

2. Discussion

It is common practice for motor vehicles to be equipped with independent suspension systems for absorbing road shock and other vibrations while providing a smooth and comfortable ride for the vehicle occupants. In suspension systems of this type, a stabilizer bar is often used to increase the roll rigidity and improve the steering stability of the vehicle. Typically, the stabilizer bar is a rod-shaped member having an elongated central segment oriented to extend laterally across the vehicle and an arm segment extending longitudinally at each end of the central segment to form a generally U-shaped configuration. The central segment of the stabilizer bar is supported for rotation about its own longitudinal access by one or more mounting brackets which are fixed to the vehicle body or frame. Most commonly, the mounting brackets are positioned in close proximity to the arm segments to minimize any bending moments which may be induced into the stabilizer bar. The distal end of each arm segment is coupled to a control arm of the suspension system by an end link. When the vehicle is subjected to a lateral rolling force such as, for example, while the vehicle negotiates a turn, the arm segments pivot In opposite directions with respect to the longitudinal axis of the central segment. As a result, torsional reaction forces are generated which act through the arm segments to urge the control arms to move toward their normal position. Thus, the vehicle body will be prevented from excessive rolling or leaning to either side by the torsional resistance produced by the stabilizer bar. As noted, end links are used to interconnect the distal end of each arm segment of the stabilizer bar to corresponding control arms. The end links function to accommodate the relative angular movement between the stabilizer bar and the control arm caused by the suspension traveling through its range of motion. Stabilizer bars are typically manufactured with an end form (i.e., eye-form or apertured panel) at each end which is adapted to receive a fastener extending from the end link. Some end links are of the "silent block" type and include a threaded fastener, such as a bolt, which extends through a sleeved rubber grommet and the end form. A lock nut is used to secure the bolt to the end form. Another type of link, commonly referred to as a "direct-acting" end link, is equipped with a ball joint for providing a quicker and stiffer response to suspension motion. In direct-acting links, a threaded shank of a ball stud extends through the end form and is likewise secured thereto using a lock nut.

Unfortunately, some existing end links have been downsized and cost analyzed such that they no longer provide adequate fatigue strength and toughness. As such, particular emphasis has been directed toward developing a robust, low mass stabilizer bar link assembly. In order for such a robust link assembly to be economically feasible, the cost of manufacture must be curtailed. Accordingly, the need exists for a device which provides for the requisite relative angular movement between components while exhibiting low weight in combination with superior fatigue strength and toughness.

SUMMARY OF THE INVENTION

Accordingly, an objective of the present invention is to provide an antiroll system for a motor vehicle's suspension having a robust, low mass stabilizer bar link assembly.

Another object of the present invention is to provide a net-shaped end link housing requiring little to no machining after casting.

As further object, a retention mechanism functions to rigidly secure a threaded shank segment of the ball stud within the end link housing. The retention mechanism includes an upper bearing having integrally molded fingers designed to compensate for dimensional variations within the as cast housing.

Accordingly, the present invention provides an end link adapted to interconnect a stabilizer bar and a suspension member within a vehicular suspension system. The end link includes a housing having a first socket, a second socket and a body interconnecting the first and second sockets. The end link also includes a first joint assembly pivotally interconnecting the first socket and the stabilizer bar and a second joint assembly pivotally interconnecting the second socket and the suspension member The first socket includes a net-shaped cavity to receive the first joint assembly.

Further objects, features and advantages of the invention will become apparent from a consideration of the following description and the appended claims when taken in connection with the accompanying drawings.

DETAILED DESCRIPTION OF THE PRESENT INVENTION

In general, the present invention is directed to an end link for connecting a stabilizer bar to a suspension member, such as a control arm, in a vehicle suspension. The end link of the present invention is adapted to replace most conventional end links and to provide improved performance without requiring modification of the other components associated with the vehicle suspension. Thus, the end link of the present invention may be utilized with a wide variety of suspension systems and is not intended to be limited to the particular application described herein.

Figure 1:
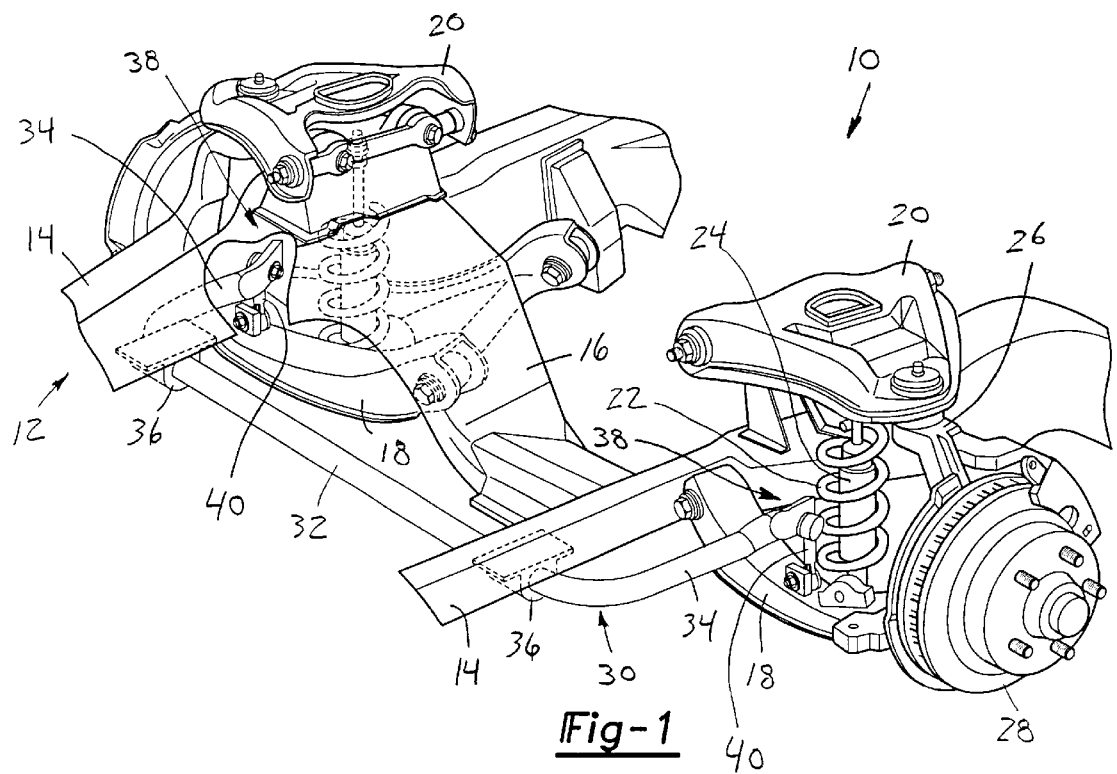
FIG. 1 is a perspective view of an exemplary independent front wheel suspension including a robust low mass stabilizer bar link assembly of the present invention.

With reference to FIG. 1, and n independent front wheel suspension system is generally indicated at reference numeral 10. Suspension 10 is of the type having upper and lower control arms and a strut assembly at each wheel which are suspended from a vehicle frame. It should be appreciated that reference will be made, to a vehicle frame, yet those skilled in the art will recognize that many current vehicles do not have a frame as such but instead have regions of the body which act as an integrated frame structure, With this in mind, frame 12 Is shown to partially include a pair of longitudinal side rails 14 and a cross beam 16.

Suspension system 10 includes a long lower control arm 18 and a short upper control arm 20 which are both pivotally attached to frame 12. A strut assembly having a helical coil spring 22 and a strut damper 24 is retained between an intermediate portion of lower control arm 18 and frame 12 to support the weight of the vehicle and any loads which are transmitted through lower control arm 18, Upper control arm 20 is connected to lower control arm 18 by a steering knuckle 26. A hub and rotor assembly 28 is rotatably attached to a spindle portion (not shown) of steering knuckle 26 such that a wheel and tire (not shown) may be mounted thereon. Suspension system 10 further includes a stabilizer bar 30 having a elongated central segment 32 which extends laterally across the vehicle, and a pair of arm segments 34 which extend longitudinally along the vehicle at each end of central segment 32, Central segment 32 is rotatably attached to frame rails 14 by a pair of mounting brackets 36. A distal end 38 of each arm segment 34 is connected to a corresponding lower control arm 18 by an end link 40 constructed in accordance with the teachings off the present invention.

Figure 2:
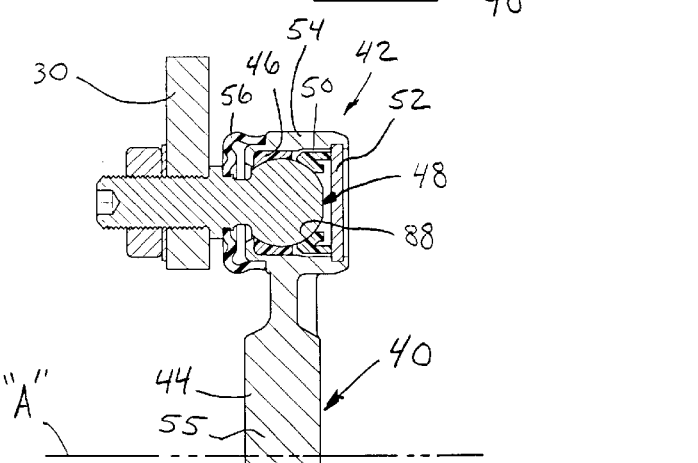
FIG. 2 is a sectional view of a portion of the stabilizer bar link assembly.
Figure 2:
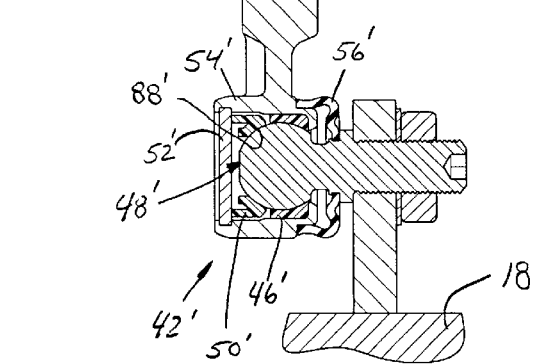
Figure 3:
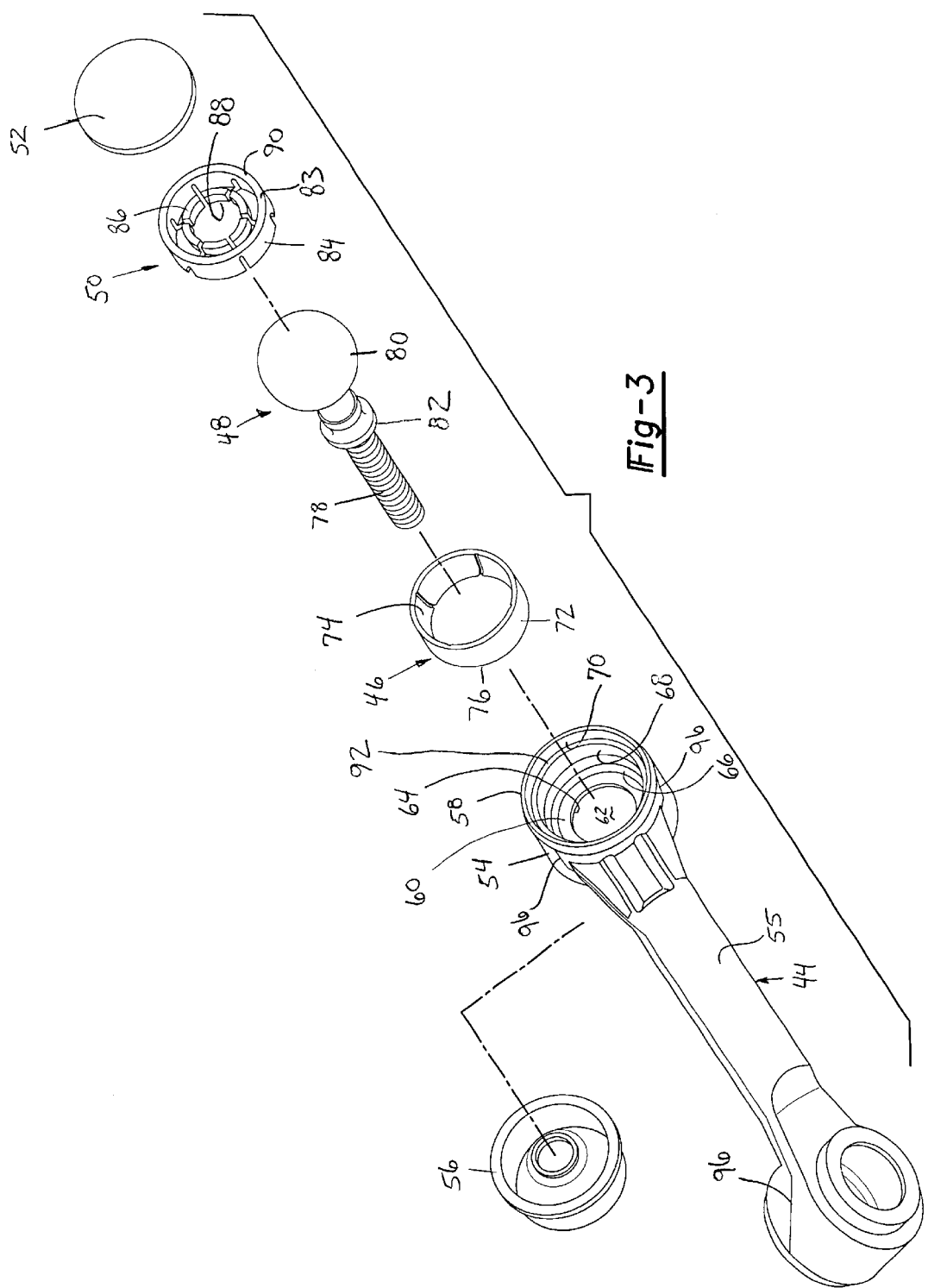
FIG. 3 is an exploded perspective view of the link assembly.

With reference to FIGS. 2 and 3, end link 40 is fastened to stabilizer bar 30 at one end and to lower control arm 18 at its opposite end. In general, the embodiment shown is symmetrical about a horizontal plane, identified by construction line "A". Each end of link 40 is assembled from a set of components including two ball joint assemblies 42 and 42' which are interconnected by a housing 44. Due to the similarity of the components associated with the ball joint assembly 42 with respect to the components of ball joint assembly 42', its components are identified with the same reference numerals except having a primed designation. Ball joint assembly 42 includes a lower bearing 46, a ball stud 48, an upper bearing 50 and a disc-shaped end cap 52. Each of the ball joint components are disposed within a socket 54 integrally formed at an end of housing 44. Housing 44 also includes a generally cylindrical body 55 interconnecting sockets 54 and 54'. A boot 56 sealingly interconnects ball stud 48 and socket 54.

Figure 4:
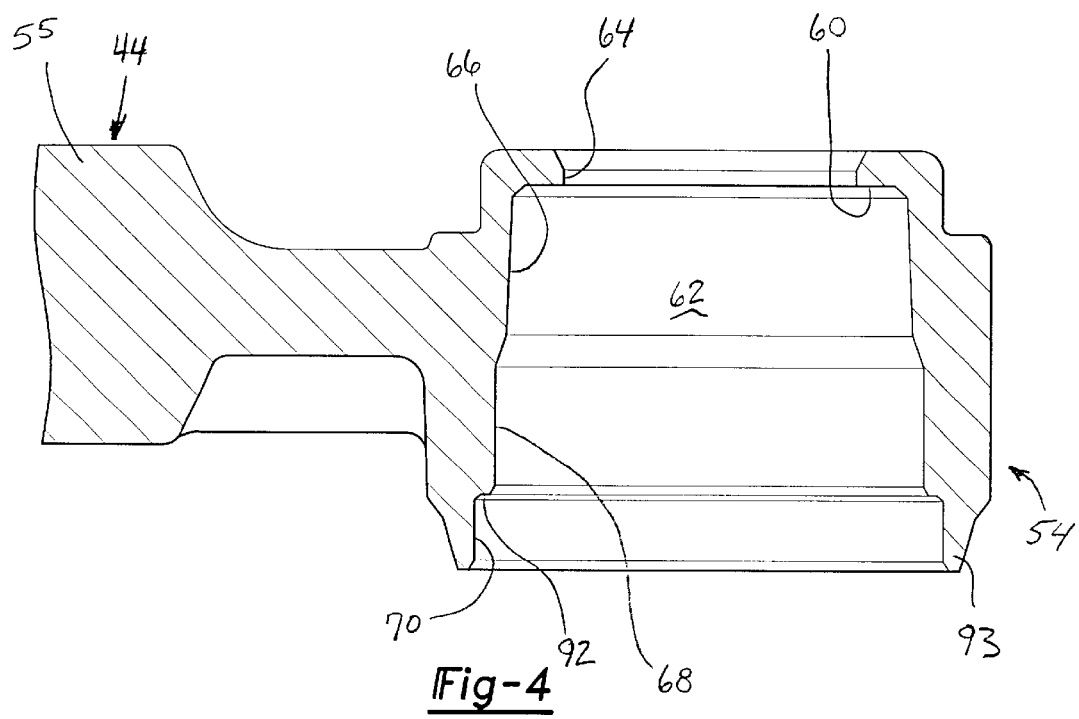
FIG. 4 is a partial sectional view of a housing casting of the link assembly of the present invention.
Figure 5:
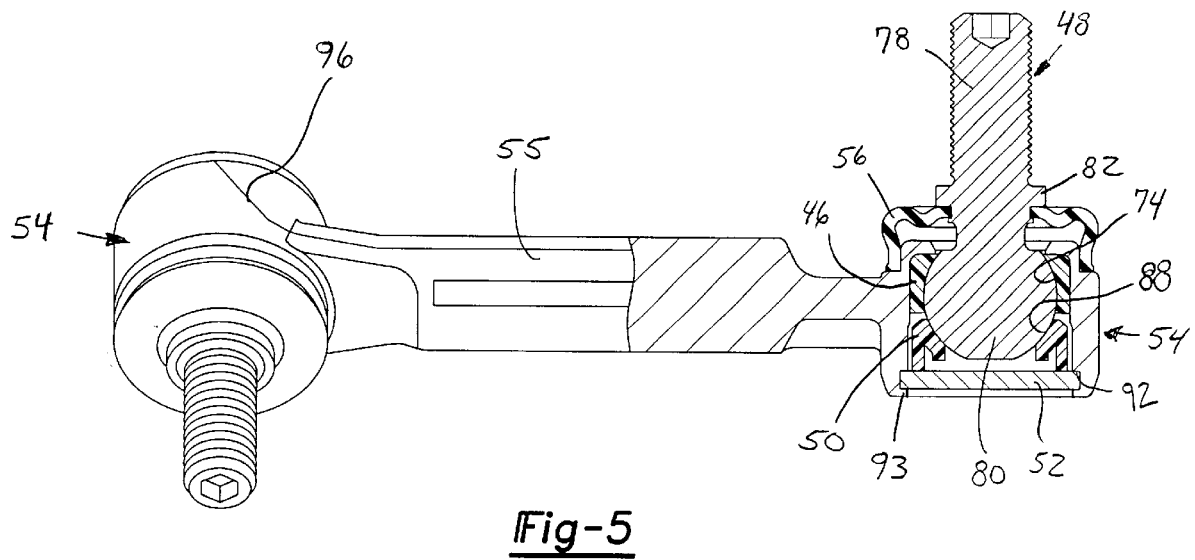
FIG. 5 is a partial cross-sectional view of the link assembly constructed in accordance with the teachings of the present invention.

With reference to FIGS. 4 and 5, socket 54 includes a side wall 58 and an end wall 60 defining a cavity 62. End wall 60 includes an aperture 64 extending therethrough. Side wall 58 is cast to define three-stepped bores namely, first bore 66, second bore 68 and third bore 70. It should be appreciated by those skilled in the art that because housing 44 is created by a casting process, each of the bores includes a draft angle to assure removal of housing 54 from the tool.

As noted earlier, an object of the present invention is to utilize housing 44 in a net-shape or as-cast condition. Specifically, bores 66, 68 and 70 are in their net shape upon removal of housing 44 from the die casting tool. No supplemental machining or forming is performed to modify the bore geometry. As such, lower bearing 46 is configured to accommodate the as-cast surface finishes and tolerances while securely aligning and retaining ball stud 48. Lower bearing 46 includes a generally cylindrical outer surface 72, a substantially spherical inner surface 74 and a stop face 76.

Ball stud 48 includes a shank segment 78 and a ball segment 80 interconnected by an integral flange segment 82.

During assembly of ball joint assembly 42, lower bearing 46 is disposed within cavity 62 and axially displaced within first bore 66 until stop face 76 abuts end wall 60. It should be appreciated that spherical inner surface 74 of lower bearing 46 extends slightly past center. Therefore, as shank segment 78 is disposed within aperture 64, ball segment 80 must be snap fit within lower bearing 46. Once lower bearing 46 and ball stud 48 have been positioned as shown in FIG. 5, upper bearing 50 is positioned within second bore 68. Upper bearing 50 includes a generally cylindrical wall 83 having an outer surface 84. A plurality of fingers 86 radially extend from wall 83. Each of fingers 86 includes a generally spherical contact surface 88. During installation, end cap 52 is forced into contact with a top face 90 of wall 83 thereby forcing surfaces 88 into contact with ball segment 80. It should be appreciated that outer surface 84 is offset from third bore 70 and upper bearing 50 may float within cavity 62 as is required.

To complete construction of ball joint assembly 42, end cap 52 is forced into contact with a land 92 within cavity 62. While contact is maintained between end cap 52 and land 92, a portion of side wall 58 is mechanically deformed to retain end cap 52 along with each of the aforementioned components within cavity 62. After mechanical deformation, portion 93 contacts end cap 52 as shown in FIG. 5. At this time, boot 56 is positioned over shank segment 78 to surround a neck 94 of ball segment 80.

In the preferred embodiment, housing 44 is constructed from a modified Aluminum Association 365.0 aluminum alloy. One skilled in the art should appreciate that the process of die casting typically does not provide components exhibiting high toughness and ductility. On the contrary, aluminum die castings typically exhibit ductility in the 1 to 3% elongation range, End link 40 of suspension system 10 is loaded during vehicle operation in a manner that typically requires a minimum of approximately 8–12% elongation. An increase in ductility is also required to mechanically deform side wall 58 in the manner previously described to retain end cap 52 without the use of external fasteners. It has been discovered that a tradeoff between material properties and magnesium content exists. As magnesium content is increased, the die cast component exhibits higher hardness and higher fatigue life. As magnesium is reduced, toughness and ductility are Increased. To obtain the optimum compromise of toughness, ductility, fatigue strength and hardness, the Aluminum Association 365.0 aluminum alloy composition was modified to define a new alloy having a magnesium content ranging from 0.19–0.29%.

Additionally, a mold parting line 96 has been positioned to assure that optimum material properties are present in the mechanical deformation area of side wall 58. Specifically, and in reference to FIG. 5, mold parting line 96 has been offset from the component centerline to the top of the component in order to optimize material properties and allow for a proper mechanical deformation of portion 93 of side wall 58. Also, body 55 maintains a relatively thicker section than bowls 54 to assure that the material properties found within the bowls are as near optimum as possible.

The foregoing discussion discloses and describes merely exemplary embodiments of the present invention. One skilled in the art will readily recognize from such discussion, and from the accompanying drawings and claims, that various changes, modifications and variations may be made therein without departing from the spirit and scope of the invention as defined in the following claims.

What is claimed is:

1. A method of constructing an end link for a vehicle suspension, the method comprising:

die casting a housing having a first socket, a second socket and a body interconnecting said first and second sockets;

positioning a first joint assembly within said first socket wherein said first socket is in an as-cast condition;

positioning a second joint assembly within said second socket wherein said second socket is in an as-cast condition; and retaining said first and second joints within said first and second sockets.

2. The method of constructing an end link of claim 1 wherein the step of retaining said first joint includes deforming a portion of said first socket to resist withdrawal of said first joint from said first socket.

3. The method of constructing an end link of claim 2 wherein the step of die casting includes positioning a parting line proximate said portion to be deformed.

4. The method of constructing an end link of claim 1 wherein the step of positioning said first joint assembly includes inserting a first bearing within said first socket in contact with an as-cast inner surface.

5. The method of constructing an end link of claim 4 wherein the step of positioning said first joint assembly includes positioning a ball stud in communication with said first bearing.

6. The method of constructing an end link of claim 5 wherein the step of positioning said first joint assembly includes positioning a second bearing within said first socket in communication with said ball stud after said first bearing and said ball stud are positioned within said first socket.

7. The method of constructing an end link of claim 6 wherein the step of die casting said first socket includes forming a first bore having a first size and a second bore having a larger size, wherein said first bore includes a first portion of said inner surface having said as-cast surface and wherein said second bore includes a second portion of said inner surface having said as-cast-surface.

8. The method of constructing an end link for a vehicle suspension, the method comprising:

die casting a housing having a first socket, a second socket and a body interconnecting said first and second sockets, wherein said first socket includes an inner surface which has not been mechanically deformed after die casting;

positioning a first joint assembly within said first socket in contact with said inner surface;

positioning a second joint assembly within said second socket; and retaining said first and second joints within said first and second sockets.

9. The method of constructing an end link of claim 8 wherein the step of positioning said first joint assembly includes inserting a first bearing within said first socket in contact with said inner surface which has not been mechanically deformed.

10. The method of constructing an end link of claim 9 wherein the step of positioning said first joint assembly includes positioning a ball in communication with said first bearing.

11. The method of constructing an end link of claim 10 wherein said second socket includes an un-cut inner surface in communication with said second joint assembly.

* * * * *